Jan. 12, 1926.  1,569,743
L. E. GOODWIN
AUTOMOBILE FENDER
Filed July 18, 1925   2 Sheets-Sheet 1
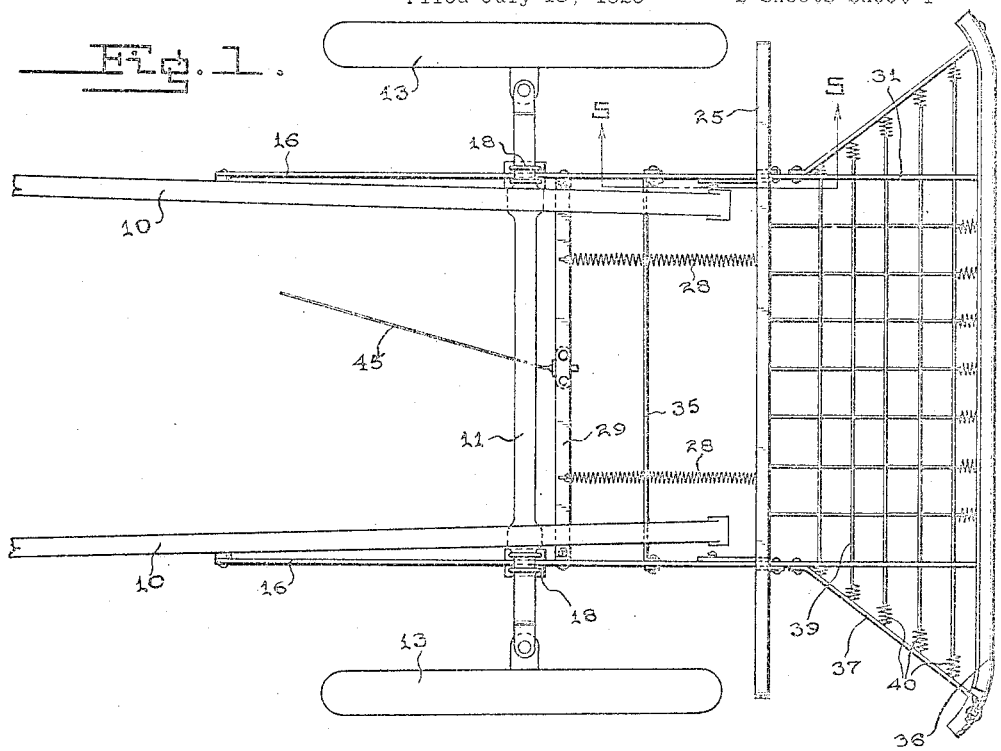
Fig.1.
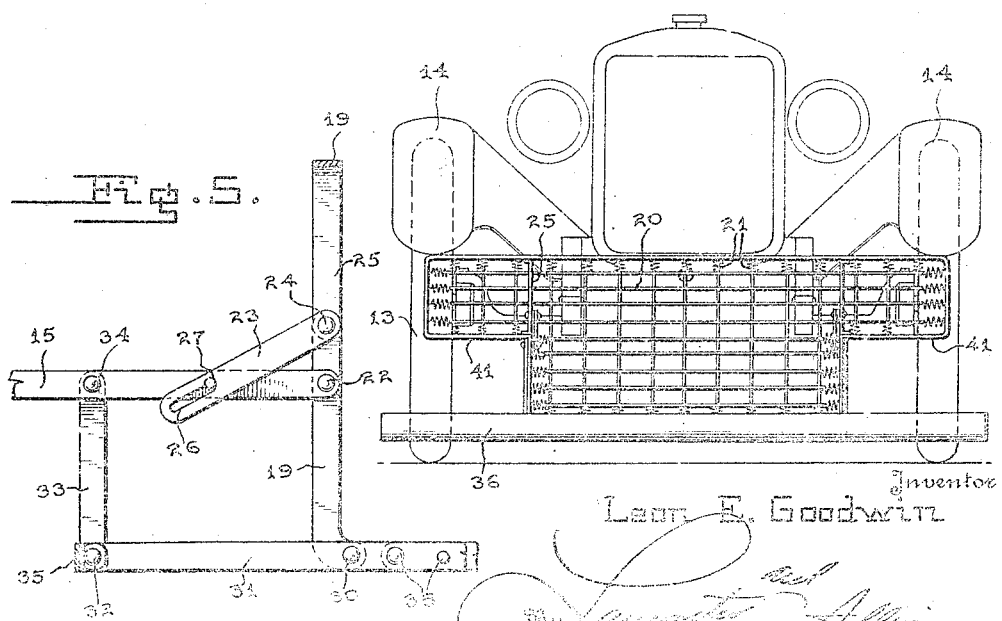
Fig.4.
Fig.5.
Inventor
Leon E. Goodwin Jan. 12, 1926.  
L. E. GOODWIN  
AUTOMOBILE FENDER  
Filed July 18, 1925

Inventor  
Leon. E. Goodwin

Patented Jan. 12, 1926.

1,569,743

UNITED STATES PATENT OFFICE.

LEON E. GOODWIN, OF PORTSMOUTH, NEW HAMPSHIRE.

AUTOMOBILE FENDER.

Application filed July 18, 1925. Serial No. 44,575.

*To all whom it may concern:*

Be it known that I, LEON E. GOODWIN, a citizen of the United States, residing at Portsmouth, in the county of Rockingham and State of New Hampshire, have invented certain new and useful Improvements in an Automobile Fender, of which the following is a specification.

The present invention relates to fenders for automobiles, and more particularly to certain improvements hereinafter described.

An object of the present invention is to provide a fender of simplified construction which when folded or in normal position presents the appearance of a bumper and does not detract from the general design of the automobile, may be light in weight and yet of strong and durable construction, and one which may be manually tripped to swing into open position and lie close to the roadway to prevent persons and objects struck from passage beneath the bumper and the vehicle.

Another object of the invention is to provide a fender of such construction that it may be easily attached to a motor vehicle without changing or modifying the same and which may be secured in place by relatively few fastening devices, and a fender which does not interfere with the normal working of the front springs, steering mechanism and adjacent parts.

A further object is to provide a fender with tripping means so arranged that it may be operated by hand so that the driver of the vehicle has his feet and one hand free to manipulate the brakes and other controls, and which requires but a momentary operation to trip the fender when the hand is freed for other use in the stopping and steering of the vehicle.

The above and various other objects and advantages of this invention will in part be described in and in part understood from the following detailed description of the present preferred embodiment, the same being illustrated in the accompanying drawings, wherein:

Fig. 1 is a fragmentary top plan view of a motor vehicle chassis having a bumper constructed according to the present invention applied thereto, the bumper being shown in open or tripped position.

Fig. 4 is a front elevation of the bumper applied to a vehicle, the bumper being tripped.

Fig. 5 is a fragmentary sectional view through a portion of the bumper frame in tripped position and Fig. 6 is a fragmentary sectional view through a portion of the bumper frame, showing the tripping latch and adjacent parts in folded position.

Figure 3:
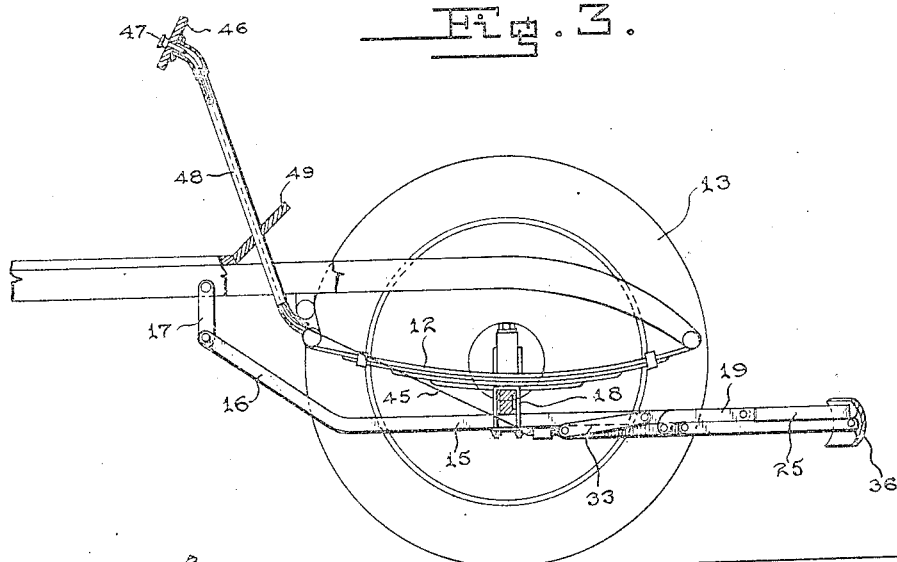
Fig. 3 is a similar view showing the bumper in folded or running position.
Figure 2:
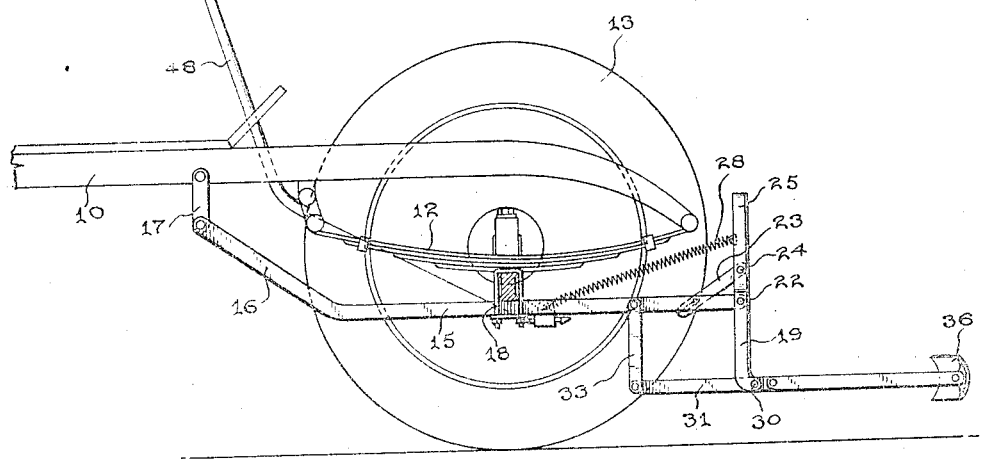
Fig. 2 is a side elevation of the same, parts being shown in section.
Figure 5:
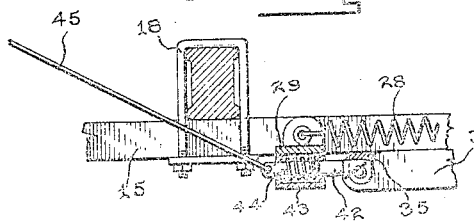

Referring to the drawings 10 designates the frame of an automobile provided with a front axle 11 and the usual springs 12. The front axle carries the road steering wheels 13 which have their upper portions covered by the mud guards 14.

The fender comprises a pair of side bars 15 which are arranged to extend across the underside of the axle 11 and which have upturned spring arms 16 pivoted by shackles 17 to the frame 10. The intermediate portions of the bars 15 are adapted to be secured to the axle 11 by clips 18 or the like to rigidly fasten the fender frame to the axle. The forward ends of the bars 15 pivotally support a back 19 which is in the form of an open frame with a preferably crossed wire filler 20, the wires of which may be connected at their ends by springs 21 with the frame 19. The pivotal support for the back 19 is shown at 22, and the frame of the back 19 is provided at opposite sides with braces 23 which are pivoted at 24 to fixed vertical braces 25 in the back 19, and which extend rearwardly and downwardly therefrom to the side bars 15, when the back 19 is swung into raised position.

The rear ends of the braces 23 are longitudinally slotted as shown at 25 and receive therethrough pins 27 which project inwardly from the bars 15 to engage the forward ends of the slots 26 and hold the back 19 in upright position. One or more springs 28 are connected to the back 19 above the braces 23 and extend rearwardly and are attached to a cross piece 29 which extends between the side bars 15 forwardly of the clips 18. The springs 28 normally urge the back 21 into upright position. The pivots 24 of the braces 23 may be provided with spacers or the like so as to insure the clearance of the braces 23 23 past the pivots 22 of the side bars 15.

The lower ends of the side pieces of the back 19 are curved forwardly and are connected by pivots 30 to the lower frame or bottom of the fender. This lower frame of the fender comprises a pair of side bars 31 which extend forwardly and rearwardly of the pivots 30 and are connected at their rear ends by pivots 32 to hangar bars 33 which are hinged at their upper ends by pivots 34 upon the upper side bars 15 rearwardly of the pins 27. The side bars 15 may be interbraced by a cross brace 35 which extends between the side bars and may be secured thereto by the pivots 34. The forward ends of the lower side bars 31 are connected to a front rail 36 of suitable form and material for picking up the person or object coming into contact with the fender and which extends laterally beyond the bars 31 and is reinforced by forwardly diverging braces 37 which are riveted at 38 to the lower bars 31 near the pivots 30 and which are suitably secured to the end portions of the front rail 36. As shown in Fig. 1, particularly, the ends of the front rail 36 are rounded or curved rearwardly to deflect objects and to prevent the fender from interlocking with other vehicles or obstacles with which the fender may come in contact. The bottom or lower frame may also be filled in with crossed wires 39 supported at their ends upon coil springs 40 connected to the bottom frame.

The upper portion of the back 19 above the pivots 22 may be laterally extended as at 41 to extend across the wheels 13 and thus prevent persons and objects from coming into contact with the wheels. To fold the fender into closed position the upper portion of the back 19 is swung forwardly and downwardly about its pivots 22. The hanger bars 33 are of a length substantially equal to the length of the back 19 below the pivots 22 so that the bottom, indicated generally at 31, may be raised flat up against the forward side of the back 19 and remain substantially in parallelism with the side bars 15 at all times. The slots 26 are of sufficient length to permit the swinging of the back 19 down into the plane of the side bars 15. The forwardly curved lower ends of the back 19 offset the back upwardly when folded so as to lie flat on the bottom 31, as shown in Fig. 3. The fender is provided with means for latching it in folded position, and this means comprises a latch bolt 42 mounted in a housing 43 secured against the lower side of the cross piece 29 and which is normally urged forwardly by a spring 44 in the housing 43 to engage beneath the cross bar 35. The lower side of the latch bolt 42, at its nose, is bevelled so as to retract the bolt 43 as the bottom of the fender is raised.

Various means may be employed for retracting the latch bolt 42 but preferably a pull wire 45 is employed and carried rearwardly and upwardly to the instrument board 46 of the vehicle and is attached to a pull handle 47 conveniently located for easy access by the operator. A guide tube 48 is preferably placed about the wire 45 and extends downwardly through the toe board 49 of the vehicle so as to protect the wire and maintain it comparatively taut under tension of the latch spring 44.

To release the fender it is only necessary to draw on the pull handle 47 sufficiently to disengage the latch 42 from the cross bar 35. The hand of the operator may then be otherwise employed in the control of the vehicle. As soon as the latch releases the cross bar 35, the springs 38 swing the back 19 into raised position and lower the bottom frame 31 and move it forwardly so as to receive the person or object. It is apparent that when the front rail 36 strikes the person or object the bottom frame will swing backwardly under tension of the springs 28 and the upper part of the back 19 will swing forwardly to catch the person or object so as to absorb the shock of impact and yieldingly receive the person or object.

It is of course understood that various changes and modifications may be made in the details of construction and design of the above specifically described embodiment of this invention without departing from the spirit thereof, such changes and modifications being restricted only by the scope of the following claims.

What is claimed is:

1. A vehicle fender comprising a frame adapted to be secured horizontally beneath the vehicle and projecting forwardly therefrom, a back hinged to the forward end of said frame, a bottom hinged to the lower end of the back and extending rearwardly therefrom beneath the frame, hanger bars pivotally connecting the rear end of the bottom to said frame, spring means between the back and the frame for normally urging the back into raised position and the bottom into a lowered forward position, and releasable means for holding the bottom raised and the back in a forwardly swung position.

2. A vehicle fender comprising a horizontal frame adapted to be secured beneath the forward end of a vehicle, a back pivoted between its upper and lower ends upon said frame, a bottom pivoted to the lower end of the back, means for pivotally supporting the bottom from said frame, said back being adapted to be swung forwardly to raise the bottom and move the same rearwardly, spring means for normally raising the back, and releasable means for maintaining the bottom in raised position.

3. A vehicle fender comprising a frame, means for rigidly securing the frame to the forward end of a vehicle, a back pivoted to said frame, means for normally urging the back into raised position, a bottom pivoted to the lower end of the back and to the rigid frame and normally urged to a lowered position by the back, and a releasable latch for normally maintaining the back in a lowered position and the bottom raised.

4. A vehicle fender comprising a frame for attachment to the front of a vehicle, a back pivoted to the frame, a bottom pivoted to the back and to the frame for raising and retracting the bottom upon the forward swinging of the back, means for normally urging the back into raised position, and a manually releasable latch on the frame for engaging the bottom and holding the same in raised and retracted position.

5. A vehicle fender comprising a horizontal frame having spring arms at its rear end, shackles on said spring arms for connecting the same to a vehicle rearwardly of the front springs of the vehicle, clips for securing the frame to the axle of the vehicle, a back pivoted to the forward end of the frame and extending below the same, a bottom pivoted to the lower end of the back and extending forwardly and rearwardly thereof, hanger bars pivotally connected between the rear end of the bottom and said frame for raising and lowering the bottom upon the swinging of the back, braces between the back and the frame, means between the braces and the frame for arresting the rearward movement of the braces and permitting the free forward swinging thereof, spring means for normally urging the back into raised position, and a manually releasable latch for holding the bottom raised and the back in a forwardly lowered position.

6. A vehicle fender comprising a frame adapted to be attached to the forward end of a vehicle, a back pivoted to the frame and extending above and below the same, a bottom pivoted to the lower end of the back and extending forwardly and rearwardly thereof, connections between the rear end of the bottom and said frame for holding the bottom in parallelism with the frame, a rail extending across the forward end of the bottom to receive impact, said back being adapted to be swung forwardly and downwardly and said bottom being adapted to be raised thereby to bring the back into engagement with the top of the bottom, spring means for urging the back into raised position, and a latch for releasable holding the back and bottom in folded position.

7. A vehicle fender comprising a frame for attachment to the forward end of a vehicle, a back frame pivoted to said first frame, a bottom frame pivoted to the lower end of the back frame and to said first frame, spring supported crossed wire fillers carried in said back and bottom frames, spring means for normally urging the back into raised position and the bottom into lowered position, and means for releasably holding the back and bottom in folded position.

LEON E. GOODWIN.